M. L. KEISER.
GAS LAMP.
APPLICATION FILED OCT. 4, 1909.

1,007,114.

Patented Oct. 31, 1911.
3 SHEETS—SHEET 1.

Fig. 1.

Witnesses
Edwin L. Bradford
Geo. B. Pitts

Inventor
Martin L. Keiser
By Edward R. Alexander
Attorney

M. L. KEISER.
GAS LAMP.
APPLICATION FILED OCT. 4, 1909.

1,007,114.

Patented Oct. 31, 1911.

Witnesses
Edwin L. Bradford
Geo. B. Pitts

Inventor
Martin L. Keiser
By 
Attorney

COLUMBIA PLANOGRAPH CO., WASHINGTON, D. C.

M. L. KEISER.
GAS LAMP.
APPLICATION FILED OCT. 4, 1909.

1,007,114.

Patented Oct. 31, 1911.

Witnesses
Edwin L. Bradford
Geo. B. Pitts

Inventor
Martin L. Keiser
By Edward R. Alexander
Attorney

UNITED STATES PATENT OFFICE.

MARTIN L. KEISER, OF CANTON, OHIO, ASSIGNOR TO THE McLAIN-GARWOOD COMPANY, OF CANTON, OHIO, A CORPORATION OF OHIO.

GAS-LAMP.

1,007,114.  Specification of Letters Patent.  Patented Oct. 31, 1911.

Application filed October 4, 1909. Serial No. 520,812.

*To all whom it may concern:*

Be it known that I, MARTIN L. KEISER, a citizen of the United States, residing at Canton, in the county of Stark and State of Ohio, (c/o The McLain-Garwood Co., Canton, Ohio,) have invented certain new and useful Improvements in and Relating to Gas-Lamps, of which the following is a specification.

This invention relates to a gas lamp having inverted incandescent burners.

The invention consists of an outer or inclosing casing, a series of mixing tubes and incandescent burners mounted therein, a valve mechanism, and an inner casing adapted to protect the mixing tubes and to quickly carry off the products of combustion, all of these parts coöperating to produce a gas lamp of simple construction comprising a series of inverted incandescent burners and to promote a circulation of air across the burners and up through the inner casing.

The invention also consists of the combination or combinations of parts hereinafter described and definitely set forth in the annexed claims.

For the purpose of illustration, I have, in the accompanying drawings, shown and herein described one form of apparatus embodying my invention.

Referring to the drawings, 1 indicates an outer or inclosing casing having a main body portion $1^a$, a top portion $1^b$, and a lower portion $1^c$. These parts are preferably formed separately to facilitate their construction and may be secured together in any well known manner.

2 indicates an annular base carried by the body $1^a$ on its interior surface.

3 indicates a skirt having an outwardly flaring open end, as shown at $3^a$, the purpose of which will hereinafter be set forth. The skirt 3 is preferably provided with lips or a flange around its upper end, each of which lips is riveted, or otherwise secured, to the said base 2.

4 indicates a hood located above the casing and spaced therefrom to permit the escape of the products of combustion from the top of the lamp.

5 indicates a globe of a suitable shape secured to the lower end of the casing 1 in a well known manner and adapted to inclose the cluster of lights.

6 indicates a gas supply pipe extending downwardly from some suitable support. The hood 4 is formed with a central opening through which the pipe 6 extends. The pipe 6 preferably serves as a support for the hood 4, it being secured thereto by a set screw $4^a$ and by which it may be adjustably positioned on the said pipe relative to the upper, open end of the casing to permit the escape of the products of combustion.

7 indicates a series of pipes, four being shown in the drawings, extending preferably at right angles to the supply pipe 6, and each being connected at its inner end to a coupling member $6^a$. The coupling $6^a$ is preferably arranged centrally of and at or near the open end of the casing 1 directly in the path of the heat and products of combustion from the lamps in order to superheat the gas before it reaches the mixing tubes of the lamps. Each of the said pipes 7 is provided with a depending or connecting pipe $7^a$.

8 indicates mixing tubes, one for each of the pipes $7^a$. 9 indicates a valve carrying and supporting connection interposed between the lower end of each of the pipes $7^a$ and the upper end of an adjacent mixing tube 8. Each of said connections is provided with screw threads $9^a$, $9^b$, whereby the adjoining ends of the adjacent pipes $7^a$ and mixing tube 8 are connected therewith. The lower end of each connection 9 is closed by a cap $9^c$, which is formed with a central aperture $9^d$ forming a valve seat for a needle valve 10 to regulate the flow of the gas from the pipe $7^a$ to the mixing tube 8.

$10^a$ indicates a turning pin extending outwardly from the sleeve 9. The inner end of the pin 10ª is connected with the needle valve 10, while its outer end is irregular in cross-section and adapted to receive a turning key 10ᵇ. The casing body 1ª is formed with an opening or slot 1ᵈ through which the key 10ᵇ is inserted to turn the pin 10ª. By the rotation of the pin 10ª the needle valve 10 is reciprocated relative to its seat 9ᵈ.

8ª indicates a series of spaced openings formed in each of the mixing tubes, preferably near its upper end and below the cap 9ᶜ of the needle valve.

12 indicates a collar for each of the mixing tubes 8 rotatably mounted thereon, and formed with a series of spaced openings 12ª adapted to register with the openings 8ª of the adjacent mixing tube 8 to permit the intake of air thereinto.

12ᵇ indicates an arm or plate carried by each of the collars 12, whereby the latter may be readily adjusted. The casing body 1ª is formed with a series of openings 1ᵉ, one being formed adjacent to or opposite each of the arms 12ᵇ to permit the key 10ᵇ or other device, to be inserted therethrough to adjust or operate the intake valve or collar 12. It will be understood that by adjusting each of the collars or valves 12 the openings 8ª of the mixing tubes will be opened to a greater or less extent, thus regulating the intake of air to the mixing tubes.

13 indicates a series of mantles, one for each of the mixing tubes 8, depending in an inverted position from the lower ends thereof. These mantles may be supported in any suitable or preferred manner.

14 indicates a casing or flue arranged within the casing 1 and adapted to protect the mixing tubes 8 and the gas and air inlet valves from the heat and products of combustion arising from the incandescent lights or mantles 13. The casing 14 being open at its upper and lower ends forms a free and unobstructed passage for the heat and products of combustion whereby they may rise directly from the lights and pass out through the upper ends of the casings 14 and 1. In order to provide a large flue space for the heat and products of combustion and to permit these elements to rise directly, vertically, from the lights 13, as well as to amply protect the mixing tubes 8, the casing 14 is corrugated longitudinally, as is illustrated in the cross sectional view, Fig. 2. Referring to this sectional view it will be seen that the corrugations of the casing 14 are formed alternately with inner and outer members, the inner extending members being of relatively small contour, as indicated at 14ª, while the outer extending corrugations are of relatively large contour, as indicated at 14ᵇ, the latter extending outwardly sufficiently far to lie close to the inner circumferential surface of the casing body 1ª. By this construction it will be seen that a series of longitudinally extending spaces 14ᶜ are formed between the walls of the inner corrugations 14ª and the inner wall of the casing 1, through which longitudinally extending spaces are arranged the pipes 7ª, the mixing tubes 8, and the gas and air inlet valves.

15 indicates an annular closing plate carried by the lower end of the inner casing 14. The inner perimeter of this closing plate corresponds to the shape, in cross-section, of the inner walls of the said casing 14, whereby the lower ends of the longitudinally extending spaces 14ᶜ are closed to prevent any heat or products of combustion rising therein. The closing plate 15 is formed with a series of openings 15ª, one for each of the mixing tubes 8 through which openings the latter extend. It will also be seen by the above described construction of the inner casing 14 that the inner extending corrugations thereof are of a size to closely fit around the pipes 7ª and mixing tubes 8, so that the heat and products of combustion may ascend vertically, directly, from the mantles 13, the latter being somewhat larger in diameter than the width of the inner corrugations 14ª, so that only a small portion of the heat and products of combustion engages with or is deflected by the lower surface of the closing plate 15 into the flue or casing 14. The inner perimeter of the closing plate 15 is preferably provided with flanges 15ᵇ to engage the inner walls of the corrugations 14ª, and its outer edge is provided with a flange 15ᶜ which is secured to the outer edges or walls of the corrugations 14ᵇ. These flanges operate to secure the closing plate to the casing 14 and to prevent the escape of the heat and products of combustion into the longitudinally extending spaces 14ᶜ or between the inner and outer walls of the casings 14 and 1. The casing 14 is provided with cutaway portions 14ᵈ at its upper end to receive the pipes 7. The lower ends of the mixing tubes 8 are provided with screw threads to receive nuts 14ᵉ. By screwing up the nuts against the plate 15, the casing 14 is locked or held firmly against the pipes 7 and rigidly maintained in position relative to the pipes 7ª and mixing tubes 8. The over-all diameter of the casing 14 is preferably such that when it is placed in the lamp casing 1 the walls of the outer corrugations 14ᵇ lie close to or engage with the inner walls of the casing 1 and maintain the casing 14 concentrically therein. The lower end of the casing 14 rests upon the annular base 2, while its upper end is provided with apertured straps or lugs 16 to receive spring operated dogs 17 mounted upon the casing 1. The base 2 may be slightly depressed or countersunk, as shown at 2' to receive the plate 15, whereby the latter will be properly positioned. The body portion $1^a$ of the casing 1 is formed with a plurality of openings $1^f$, $1^g$, in close proximity to the air inlet valves 12, while the lower portion $1^c$ of the casing is formed with a plurality of openings $1^h$ which permit a free circulation of air through the casing and within the globe 5, the flaring opened end of the skirt 3 operating to deflect these air currents downwardly into the lower portion of the space within the globe 5. As the annular base 2 and closing plate 15 close entirely the lower ends of the longitudinally extending spaces $14^c$ containing the mixing tubes 8, it will be seen that all of the air circulating through the openings $1^h$ is carried downwardly within the globe 5 and assists in the combustion of the gas and in carrying off the heat and products of combustion through the flue 14 and the upper open end of the casing 1. This construction of base 2 and closing plate 15 also prevents any of the heat or products of combustion ascending into the space surrounding the mixing tubes 8 and their air inlet valves.

18 indicates as a whole, a main valve mechanism arranged in the gas supply pipe 6 preferably below the hood 4 and operating to control the supply of gas to all the pipes 7. This valve mechanism preferably comprises a casing $18^a$ formed with a gas receiving chamber $18^b$ and having an offset $18^c$ formed with a conduit $18'$ leading from the chamber $18^b$ to a pilot light tube 19. The valve casing $18^a$ and coupling $6^a$ are preferably formed integral and comprise a connecting means between the gas supply pipe 6 and the pipes 7. The valve casing $18^a$ is also formed with a valve-receiving chamber $18^d$, a main gas conduit $18^e$ connected at its upper end with the gas receiving chamber $18^b$, and at its lower end connected with ducts $18^f$ formed in the coupling $6^a$ and leading to the inner ends of three of the pipes 7, and an auxiliary conduit $18^g$ leading from the gas receiving chamber $18^b$ to a duct $18^h$ formed in the coupling $6^a$ and leading to the inner end of one, the remaining one, of the pipes 7. In order to regulate the normal or perpetual flow of gas to the pilot tube 19, a valve $18^2$, mounted in the offset $18^c$, is provided to open and close the opening for the conduit $18'$ from the gas receiving chamber $18^b$.

Figure 1:
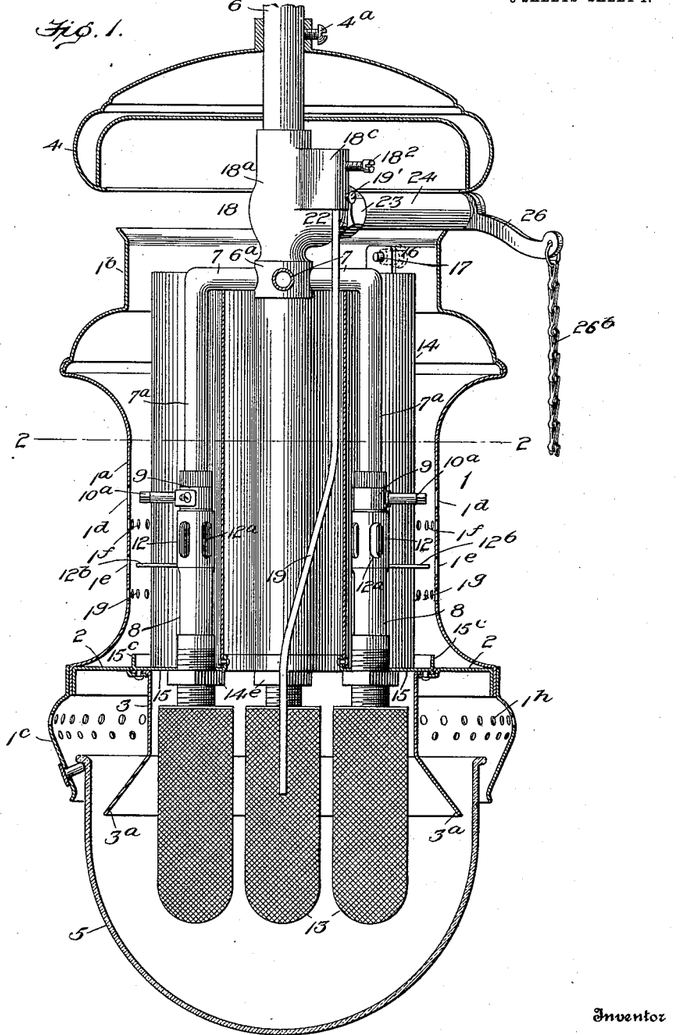
Figure 1 is a vertical section of a gas lamp embodying my invention.
Figures 2, 3, 5, 7, 8:
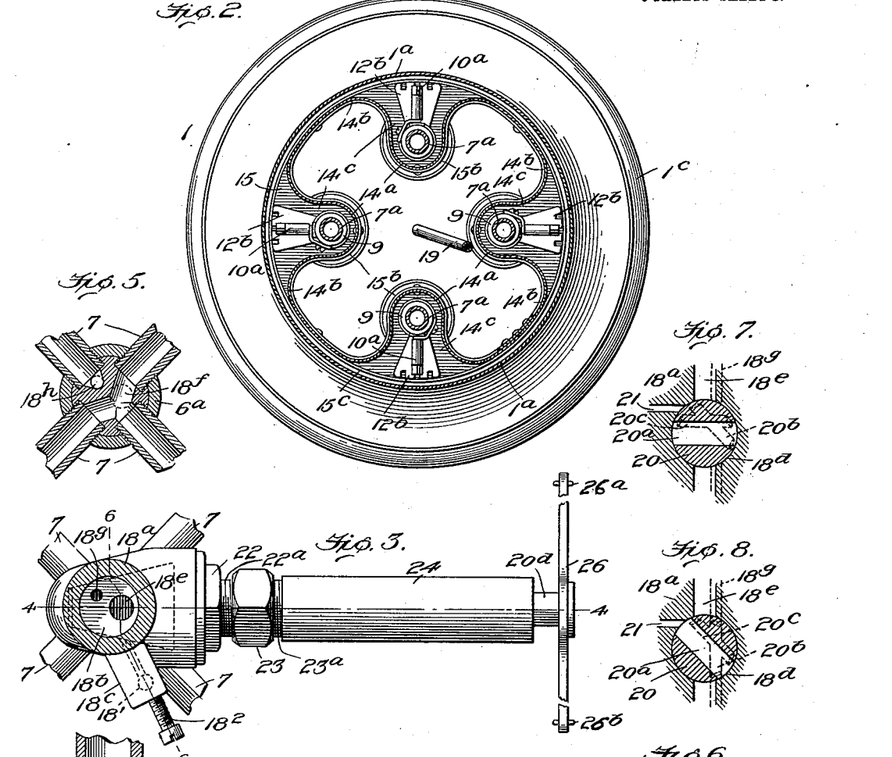
Fig. 2 is a horizontal section on the line 2—2, of Fig. 1.
Fig. 3 is an elevation of the inner casing.
Figs. 4 to 10, inclusive, are detail views.
Figures 4, 9:
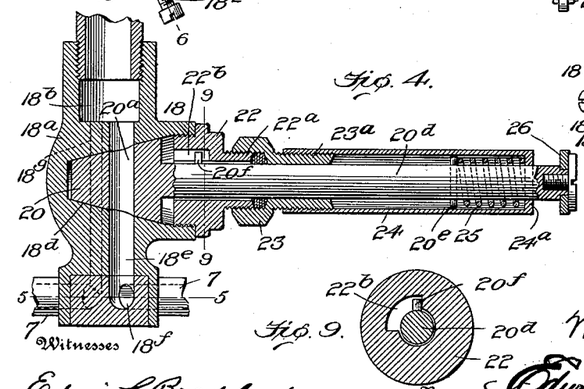
Figure 6:
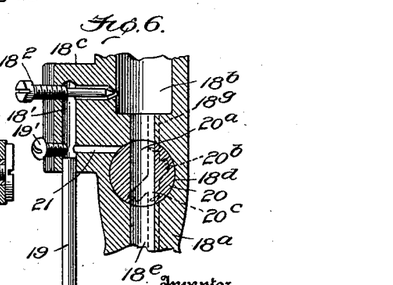
Figure 10:
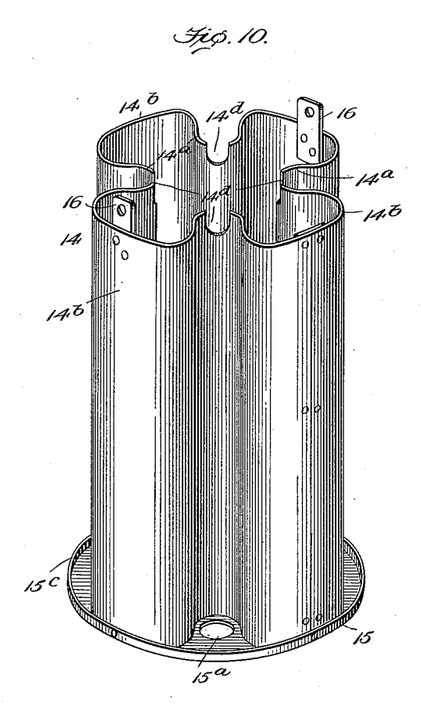
Figure 11:
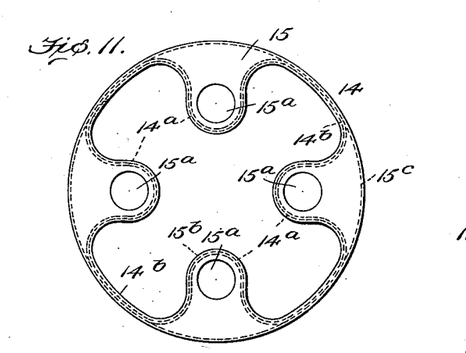
Fig. 11 is a bottom plan view of the casing or flue and the closing plate therefor.
Figures 12, 13, 14:
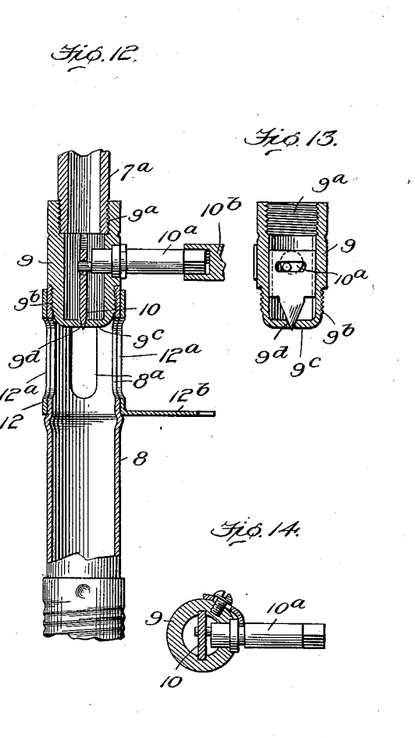
Figs. 12 to 15 are detail views of one of the mixing tubes and the valves therefor.
Figure 15:
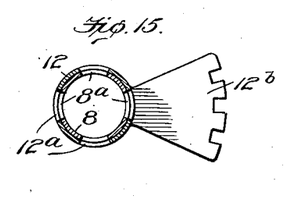

20 indicates a valve rotatably mounted in the valve receiving chamber $18^d$ of the valve casing $18^a$ and formed with a main duct $20^a$ adapted to register with the main conduit $18^e$ of the valve casing $18^a$, and also formed with a pair of intersecting auxiliary ducts $20^b$, $20^c$ one of which is adapted to register with the auxiliary conduit $18^g$ of the valve casing when the main duct $20^a$ of the valve 20 and main conduit $18^e$ of the valve casing are in register, while the other auxiliary duct is adapted to register with the auxiliary conduit $18^g$ of the valve casing $18^a$ when the valve 20 is slightly turned, as indicated in Fig. 8, to close the main conduit $18^e$. By this construction it will be seen that by proper manipulation of the valve 20 one only or all of the inverted lights 13 may be lighted. By a further manipulation of the valve to the position shown in Fig. 7, all of the lights may be shut off. 21 indicates a duct leading from the conduit $18'$ to the valve receiving chamber $18^d$. The purpose of this conduit is to provide a supply of gas to the pilot 19 to cause a flash during the turning of the valve 20 and just prior to the registry of the duct $20^a$ with the main conduit $18^e$, and it will be seen that by rotating the valve 20 from the position shown in Fig. 7 to its position shown in Fig. 6 that for a short interval of time the main duct $20^a$ in the valve will form a passage-way between the main conduit $18^e$ of the valve casing $18^a$ to the conduit $18'$, whereby a supply of gas will flow to the pilot 19 and cause a flash at its free or lighted end.

$19'$ indicates a valve for regulating the flow of gas through the conduit 21 to the conduit $18'$.

As shown in the drawings the valve casing $18^a$ is preferably constructed to form a conically shaped valve receiving chamber $18^d$ that is closed at its inner end, the purpose of which is to reduce to a minimum the probability of leakage of the gas around the valve 20 and to obviate the construction or use of a valve lock retainer or packing at this free end of the valve, as is necessary where the valve plug extends entirely through the valve casing. The valve 20 is of conical shape adapted to fit closely within the valve receiving chamber $18^d$, and is provided with means for pressing it tightly against the walls of its receiving chamber or seat $18^d$. These means preferably comprise a cap or collar 22 screw threaded into the open end of the valve receiving chamber $18^d$ and having a reduced portion $22^a$ provided with screw threads adapted to receive a nut 23, which is provided with a screw threaded sleeve portion $23^a$.

$20^d$ indicates a stem or rod connected with the valve 20 and extending through the cap or collar 22 and nut 23.

24 indicates a tube or sleeve having screw threaded connection with the sleeve portion $23^a$ of the nut 23 and provided with an inwardly extending flange $24^a$ at its free end.

25 indicates a coiled spring surrounding the stem $20^d$ and interposed between the flange $24^a$ and a pin or collar or abutment $20^e$ carried by the valve stem $20^d$. By this construction of valve retaining mechanism it will be seen that the tension of the spring 25 upon the pin or collar 20$^e$ will operate to press the valve 20 closely against the walls of the valve receiving chamber 18$^d$.

26 indicates a rocker carried by the outer end of the valve stem 20$^d$ for the purpose of rotating or manipulating the valve in opposite directions. The opposite ends of this rocker have connected to them chains or cords, as indicated at 26$^a$, 26$^b$. The cap 22 is preferably formed with a recess 22$^b$ to receive a projection 20$^f$ carried by the valve stem 20$^d$, which projection 20$^f$ will engage the opposite end walls of the recess 22$^b$ to limit the rotation of the valve 20 when opened and closed.

In the above construction of valve mechanism it will be seen that the valve 20 is always maintained tightly in proper position against its seat, and that the valve stem 20$^d$ and sleeve 24 are of a length to extend laterally beyond the walls of the inner casing, so that the spring 25 is arranged out of the path of the intense heat ascending through the upper end of the inner casing 14.

As the tube or sleeve 24 is screw threaded at its inner end to the nut sleeve 23$^a$, it will be understood that by the rotation of the tube or sleeve 24 the tension of the spring 25 may be increased to more tightly press the valve 20 against its seat and to take up the wear between these parts.

To those skilled in the art of making apparatus of the class described, many alterations in construction and widely differing embodiments and applications of my invention will suggest themselves, without departing from the spirit and scope thereof. My disclosures and the description therein are purely illustrative, and are not intended to be in any sense limiting.

It will be noted that the arrangement of parts is such as to permit a very compact assembly of the mantles, and the concentration of the heat therefrom, for the most part, in a comparatively small space.

The valve mechanism which I have devised I have found to be peculiarly adapted for use in connection with a gas lamp of the type shown in the drawings, wherein the valve for controlling the gas supply is arranged in the path of the products of combustion which pass upwardly from the burners. It will be noted that the valve 20 is tapered to a considerable extent and that it is yieldingly held against its seat, so as to allow for the movement of the valve relative to its seat under the action of expansion of the metal when subjected to the heat of the escaping gases of combustion. This construction insures that the valve will be readily turnable irrespective of the heat to which it is subjected, and will be free to expand under said heat. It will be further noted that the main duct 20$^a$ through the valve serves as a duct for establishing communication between the main duct 18$^e$ of the valve casing and the flash duct 21 for the purpose of flashing the pilot light.

What I claim is:

1. The combination of an inclosing casing, a vertically extending longitudinally corrugated flue, means for supporting the flue, a gas supply pipe, a series of depending pipes leading from said gas supply pipe and extending longitudinally of the said flue between the outer walls thereof and the inner walls of the casing, the free end of each of said pipes being provided with an inverted mantle, and means for controlling the supply of gas to said pipes.

2. The combination of an inclosing casing, a vertically extending longitudinally corrugated flue arranged to form passageways between the outer walls of the flue and the inner walls of the casing, a plate for closing the lower ends of the passageways, a gas supply pipe, a series of depending pipes leading from said gas supply pipe and extending longitudinally of the said flue through said passageways, the free end of each of said pipes being provided with an inverted mantle, means for controlling the supply of gas to said pipes, and each of said pipes being provided with independently controlled gas and air inlet valves.

3. In a gas lamp, the combination of an inclosing casing, a flue concentrically arranged within the said inclosing casing, the said flue being corrugated longitudinally to form chambers or passage-ways between its outer walls and the inner walls of the inclosing casing, gas pipes leading through said passage-ways, an annular base within the inclosing casing, a plate mounted on the base for closing the passageways between the flue and the casing, lighting mechanism arranged in an inverted position and mounted on the lower ends of the said gas pipes and below the lower end of the said flue, and means for controlling the supply of gas to each of the said gas pipes.

4. In a gas lamp, the combination of an inclosing casing, a longitudinally corrugated flue, means for supporting the flue in the casing, the outer extending corrugations of the said flue being relatively larger than the inner extending corrugations thereof, a series of gas pipes extending longitudinally of the flue and arranged in close proximity to the walls of the inner corrugations of the flue and between the outer walls thereof and the inner walls of the inclosing casing, each of said pipes being provided with inverted light mantles at its free end, and means for controlling the supply of gas to each of said gas pipes.

5. In a gas lamp, the combination of a casing provided with an annular base, a longitudinally corrugated flue vertically arranged within the casing and arranged to form passage-ways between the outer walls of the flue and the inner walls of the casing, an annular plate mounted on the base for closing the lower ends of said passage-ways and formed with a series of openings, the inner perimeter of the said plate corresponding to the perimeter of the inner walls of the said flue, a series of gas pipes extending through the said passage-ways between the flue and the said casing, and through the openings formed in the closing plate, a series of gas mantles, one for each of said gas pipes, mounted in inverted position on their lower ends, and means for controlling the supply of gas to said pipes.

6. In a gas lamp, the combination of a casing, a longitudinally corrugated flue arranged within the casing, and adapted to form passage-ways between the flue and the inner walls of the said casing, the said gas pipes being each provided with independently controlled gas valves and air intake valves, the said gas pipes extending below the lower end of the said flue and each provided with an inverted gas mantle, and means for closing the lower end of the said passage-ways to prevent the heat and products of combustion from rising up and around the said gas pipes and their gas and inlet valves.

7. In a gas lamp, the combination of a casing provided with an annular base, and formed with a series of openings above said base, a longitudinally corrugated flue arranged within the casing, and adapted to form passage-ways between the flue and the inner walls of the said casing, the outer extending corrugations of the flue being relatively larger than the inner corrugations thereof to permit the heat and products of combustion from the said gas mantles to rise directly therefrom, the said gas pipes being each provided with independently controlled gas valves and air intake valves, the said gas pipes extending below the lower end of the said flue and each provided with an inverted gas mantle, and means mounted on said base for closing the lower end of the said passage-ways to prevent the heat and products of combustion from rising up and around the said gas pipes and their gas and inlet valves.

8. In a gas lamp, the combination of a casing having an annular base, said casing being formed with a series of air inlet openings above and below said annular base, a flue corrugated longitudinally to form passage-ways between the said flue and the said casing, a series of gas pipes leading through said passage-ways, and provided with inverted gas mantles at their lower ends below the said base of the casing, each of said gas pipes being provided with air inlet valves in close proximity to the openings formed in the casing above the said annular base, means for supporting the flue and for closing the lower ends of said passage-ways to prevent a circulation of air from the said passage-ways to the flue or to the space below said base, and to prevent heat or products of combustion rising through said passage-ways from the gas mantles, and means for controlling the supply of gas through said gas pipe.

9. In a gas lamp, the combination of a casing having an annular base, said casing being formed with a series of air inlet openings above and below said annular base, a flue corrugated longitudinally to form passage-ways between the said flue and the said casing, a series of gas pipes leading through said passage-ways, and provided with inverted gas mantles at their lower ends below the said base of the casing, each of said gas pipes being provided with air inlet valves, means mounted on the base for closing the lower ends of said passage-ways to prevent a circulation of air from the said passage-ways to the flue or to the space below said base, and to prevent heat or products of combustion rising through said passage-ways from the gas mantles, means for controlling the supply of gas through said gas pipe, and a skirt supported by said base and arranged to deflect air circulating through the openings formed in the casing below the base downwardly.

10. In a gas lamp, the combination of a casing having an annular base, said casing being formed with a series of air inlet openings above and below said annular base, a flue corrugated longitudinally to form passage-ways between the said flue and the said casing, a series of gas pipes leading through said passage-ways, and provided with inverted gas mantles at their lower ends below the said base of the casing, each of said gas pipes being provided with air inlet valves, means mounted on the base for closing the lower ends of said passage-ways to prevent a circulation of air from the said passage-ways to the flue or to the space below said base, and to prevent heat or products of combustion rising through said passage-ways from the gas mantles, means for controlling the supply of gas through said gas pipe, and a skirt having a flaring open end supported by said base and arranged to deflect air circulating through the openings formed in the casing below the base downwardly.

11. In a gas lamp, the combination of a casing having an open upper end, a longitudinally corrugated flue concentrically arranged within said casing, and arranged to form a series of passage-ways between its outer walls and the said casing, means for supporting the said flue, and for closing the lower ends of said passage-ways, a gas supply means arranged above the said casing, a series of pipes connected with said supply means, each of said pipes extending downwardly through one of said passage-ways and the said closing means therefor, and provided on its lower end with an inverted gas mantle, and means for controlling the supply of gas through said gas supply means.

12. In a gas lamp, the combination of a casing having an open upper end, a longitudinally corrugated flue concentrically arranged within said casing, and arranged to form a series of passage-ways between its outer walls and the said casing, means for closing the lower ends of said passage-ways, gas supply means arranged above the said casing, a series of pipes connected with said supply means, each of said pipes extending downwardly through one of said passage-ways and the said closing means therefor, and provided on its lower end with an inverted gas mantle, means for controlling the supply of gas through said gas supply means, and a hood arranged above the said controlling means for protecting the open end of the casing.

13. In a gas lamp, the combination of a casing, a flue concentrically arranged therein, means for supporting the flue, the said flue being longitudinally corrugated to form passage-ways between its outer walls and the inner walls of the said casing, a series of inverted gas mantles, a series of gas pipes each connected with a gas mantle, and leading through one of said passage-ways, each of said gas pipes comprising a supply pipe, a mixing tube provided with an air intake valve, and a coupling piece provided with a gas valve interposed between the supply pipe and the adjacent mixing tube, and means for controlling independently each of said gas and air intake valves.

14. In a gas lamp, the combination of a casing, a flue concentrically arranged therein, means for supporting the flue, the said flue being longitudinally corrugated to form passage-ways between its outer walls and the inner walls of the said casing, a series of inverted gas mantles, a series of gas pipes each connected with a gas mantle, and leading through one of said passage-ways, each of said gas pipes comprising a supply pipe, a mixing tube provided with an air intake valve, and a coupling piece provided with a gas valve interposed between the supply pipe and the adjacent mixing tube, means for controlling independently each of said gas and air intake valves and separate means for controlling the supply of gas to all of said gas pipes.

15. In a gas lamp, the combination of a casing, a flue extending through said casing and corrugated longitudinally to form passage-ways between its outer walls and the inner walls of the casing, a series of gas mantles arranged below the lower end of the flue, a series of gas pipes leading through said passage-ways and connected with said gas mantles, independently controlled air intake valves arranged in each of said gas pipes, the said casing being provided with two series of air inlet openings, one series being above the lower end of the said flue and the other series of openings being below the said end, and means intermediate the said series of openings for closing the passage-ways between the flue and the casing, the said means being arranged below the said air intake valves to prevent the heat and products of combustion from rising up and around the air inlet valves.

16. In a gas lamp, the combination of a casing, a flue extending through said casing and corrugated longitudinally to form passage-ways between its outer walls and the inner walls of the casing, a series of gas mantles arranged below the lower end of the flue, a series of gas pipes leading through said passage-ways and connected with said gas mantles, independently controlled air intake valves arranged in each of said gas pipes, the said casing being provided with two series of air inlet openings, one series being above the lower end of the said flue and the other series of openings being below the said end, and means intermediate the said series of openings for closing the passage-ways between the flue and the casing, the said means being arranged below the said air intake valves to prevent the heat and products of combustion from rising up and around the air inlet valves, and means for deflecting the air circulating through the last said series of openings downwardly.

17. In a gas lamp, the combination of a casing, a flue extending through said casing and corrugated longitudinally to form passage-ways between its outer walls and the inner walls of the casing, a series of gas mantles arranged below the lower end of the flue, a series of gas pipes leading through said passage-ways and connected with said gas mantles, independently controlled air intake valves arranged in each of said gas pipes, the said casing being provided with two series of air inlet openings, one series being above the lower end of the said flue and the other series of openings being below the said end, and means intermediate the said series of openings for closing the passage-ways between the flue and the casing, the said means being arranged below the said air intake valves to prevent the heat and products of combustion from rising up and around the air inlet valves, and a skirt having an outwardly flaring open end for deflecting the air circulating through the last said series of openings downwardly.

18. In a gas lamp, the combination of a casing, a flue extending through said casing and corrugated longitudinally to form passage-ways between its outer walls and the inner walls of the casing, a series of gas mantles arranged below the lower end of the flue, a series of gas pipes leading through said passage-ways and connected with said gas mantles, independently controlled air intake valves arranged in each of said gas pipes, the said casing being provided with two series of air inlet openings, one series being above the lower end of the said flue and the other series of openings being below the said end, and means intermediate the said series of openings for closing the lower ends of the passage-ways between the flue and the casing, the said means being arranged below the said air intake valves to prevent the heat and products of combustion from rising up and around the air inlet valves.

19. In a gas lamp, the combination of a casing, a flue arranged within said casing and corrugated longitudinally from end to end to form passageways between its outer wall and the inner wall of the casing, a series of gas pipes, one for each passageway, extending therethrough, mantles carried by said pipes, and means extending between the outer walls of the flue and the inner walls of the casing for closing the passageways at or near their lower ends.

20. In a gas lamp, the combination of a casing, a flue arranged within said casing and corrugated longitudinally from end to end to form passageways between its outer wall and the inner wall of the casing, a series of gas pipes, one for each passageway, extending therethrough, mantles carried by said pipes, and means extending between the outer walls of the flue and the inner walls of the casing for closing the passageways at or near their lower ends, the said closing means comprising a base carried by the casing and a plate mounted on the said base.

21. The combination with a plurality of burners, mantles therefor, and a fuel supply pipe arranged above the said burners, of a fuel regulating valve mechanism arranged directly in the path of the escaping products of combustion, comprising a casing having a conical seat, and a valve yieldingly held against said seat, the yielding holding means for said seat being arranged at one side and out of the path of the escaping products of combustion.

22. The combination with a plurality of burners, mantles therefor, and a fuel supply pipe arranged above the said burners, of a fuel regulating valve mechanism arranged directly in the path of the escaping products of combustion, comprising a casing having a conical seat closed at its inner end, a conical valve, and a spring arranged at one side and out of the path of the escaping products of combustion for yieldingly supporting the valve against said seat.

23. The combination with a plurality of burners, mantles therefor, and a fuel supply pipe arranged above the said burners, of a fuel regulating valve mechanism arranged directly in the path of the escaping products of combustion of a hydrocarbon lamp, comprising a casing having a conical seat closed at its inner end, a conical valve having a stem extending laterally from said casing, a detachable collar surrounding said valve stem and closing the open end of the said casing, a packing gland nut screw threaded to said collar, a sleeve connected to said nut, an abutment on said valve stem within said sleeve, and a spring between said abutment and sleeve arranged to yieldingly press the valve against its seat.

24. The combination with a plurality of pipes, burners carried thereby, and a fuel supply pipe arranged above the said burners, of a fuel regulating valve mechanism for location in the path of the escaping products of combustion of a hydrocarbon lamp, comprising a valve casing formed with a supply chamber, a valve seat, a main duct leading from the supply chamber to the valve seat, a supplemental supply duct leading from the supply chamber to the valve seat, a main pilot duct leading from the supply chamber, a supplemental pilot duct leading from a port in the valve seat to the main pilot duct, a main escape duct leading from the valve seat to all of the burner pipes except one, a supplemental escape duct leading from the valve seat to the remaining burner pipe, and a valve having a main duct with ports registering with the main supply and escape ducts in the valve casing and arranged to move into and out of registry therewith, and adapted to establish communication between said main supply duct and said supplemental pilot duct at a predetermined interval, the said valve also having a pair of auxiliary ducts, one adapted to register with the supplemental supply and escape ducts of the valve casing when the main duct in the valve registers with the main supply and escape ducts in the valve casing, and the other adapted to register with the supplemental supply and escape ducts when the main duct of the valve is out of registry with the main supply and escape ducts in the valve casing.

25. In a gas lamp, the combination of a casing, a longitudinally corrugated flue, means for supporting said flue within said casing and permitting it to be removed therefrom, a series of gas pipes extending longitudinally of said flue between its outer wall and the inner wall of said casing, an inverted mantle arranged at the lower end of each of said gas pipes, and a cone shaped skirt supported by and depending downwardly from said flue supporting means.

In testimony whereof I affix my signature, in the presence of two witnesses.

MARTIN L. KEISER.

Witnesses:
T. K. HARRIS,
M. E. LUTZ.

Copies of this patent may be obtained for five cents each, by addressing the "Commissioner of Patents, Washington, D. C."